United States Patent Office 2,776,190
Patented Jan. 1, 1957

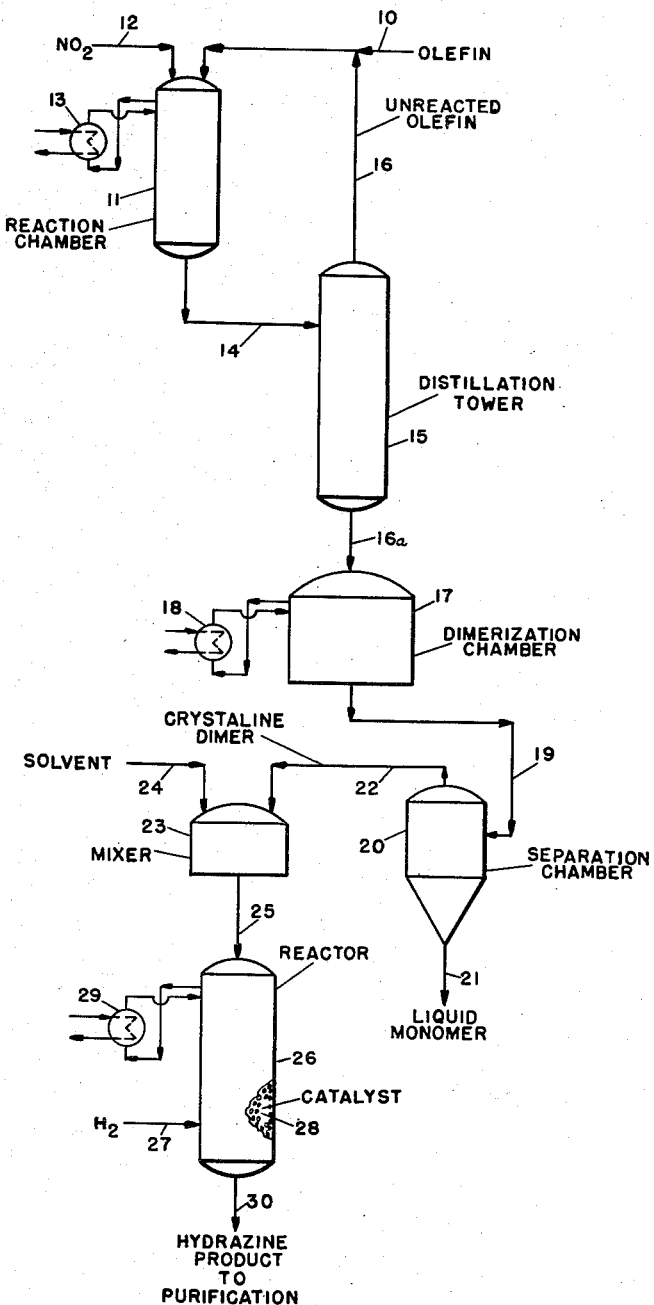

2,776,190
MANUFACTURE OF HYDRAZINE

Russell M. Mantell, Newark, N. J., and Otto J. Plescia, Madison, Wis., assignors to The M. W. Kellogg Company, Jersey City, N. J., a corporation of Delaware Application July 14, 1950, Serial No. 173,857

16 Claims. (Cl. 23—190)

This invention relates to the manufacture of hydrazine. In one aspect the invention relates to a process for the manufacture of hydrazine from olefins. An object of the invention is to provide an efficient process for the manufacture of hydrazine. Another object of the invention is to provide an efficient process for the manufacture of hydrazine from readily available materials. Other objects and advantages inherent in the invention will become apparent from the following description.

According to this invention, the manufacture of hydrazine is accomplished, generally, under conditions as more fully hereinafter disclosed, by reacting an olefin with a nitrosating agent to produce the corresponding nitroso-nitrate addition compound. The nitroso-nitrate addition compound thus produced is next converted to the corresponding bimolecular nitroso compound. This bimolecular nitroso compound is then hydrogenated to produce hydrazine as a product of the process.

The olefin employed as the starting material, is one having at least one unsaturated tertiary carbon atom per molecule and may be employed in the liquid or gaseous state. Suitable olefins are isobutylene; 2 methyl 2,3 butene; 2 methyl 2,3 hexene; 2 methyl 2,3 heptene; 2 methyl 2,3 octene; 3 ethyl 3,4 pentene; 3 propyl 3,4 octene; and 3 butyl 3,4 nonene.

The nitrosating agent employed for reaction with the olefin starting material is one other than nitrous oxide, and may be employed either as a liquid, solid or gas. Suitable nitrosating agents are nitrogen dioxide, nitric oxide, nitrogen trioxide, and nitrogen pentoxide.

As indicated above, the olefin is reacted with the nitrosating agent to produce the corresponding nitroso-nitrate addition compound as an intermediate product in the process. This reaction may be represented as follows, in which isobutylene and nitrogen dioxide are employed as typical reactants:

REACTION A

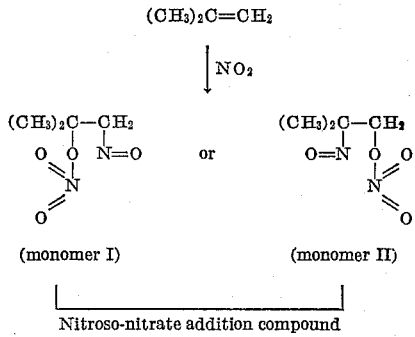

Nitroso-nitrate addition compound

From Reaction A, it will be seen that the intermediate nitroso-nitrate addition compound may be obtained, as its monomeric form, either with the nitroso (NO) group attached to the terminal primary carbon atom of the isobutylene molecule, as shown by the configuration of monomer I; or with the nitroso group attached to the adjacent tertiary carbon atom, as shown by the configuration of monomer II.

The reaction between the olefin and nitrosating agent to produce the monomeric nitroso-nitrate addition product, is carried out at a temperature between about −140° C. and about 200° C. The reaction may be conducted either under liquid phase, vapor phase, or mixed phase conditions. The term "liquid phase conditions" refers to the operation in which both the olefin and nitrosating agent reactants are in the liquid state. The term "vapor phase conditions" refers to the operation in which both the olefin and nitrosating agent reactants are in the vapor or gaseous state. In carrying out reaction between the olefin and nitrosating agent under liquid phase conditions, it has been found that temperatures between about −140° C. and about 50° C. are best suited to this operation, with temperatures between about −20° C. and about 20° C. being preferred. In carrying out the reaction under vapor phase conditions, temperatures between about −10° C. and about 200° C. are best suited to this operation, with temperatures between about 20° C. and about 100° C. being preferred.

In carrying out reaction between the olefin and nitrosating agent, it is preferred to have the olefin component present in excess of the stoichiometric requirements of the nitrosating agent in order to avoid any violence of reaction. This can be effected by adding the stoichiometric requirement of the nitrosating agent to an excess of the stoichiometric requirement of the olefin component in a suitable reaction vessel, as more fully hereinafter described. If the nitrosating operation is carried out under liquid phase conditions, or mixed phase conditions in which one component is a liquid and the other either a gas or solid, agitation of the resulting mixture within the reaction vessel, while the nitrosating agent is added to the olefin, is desirable in order to insure complete reaction.

The resulting reaction product of either liquid, vapor or mixed phase operations is a liquid mixture comprising the monomeric nitroso-nitrate addition product and excess olefin. This mixture is next withdrawn from the reaction vessel. The unreacted component is next separated from this mixture by evaporation or distillation, and may be returned to the initial reaction vessel for contact with further quantities of the nitrosating agent, leaving the liquid monomer nitroso-nitrate addition compound as a residue. This residue is withdrawn from the evaporation or distillation vessel.

It has been found that upon sufficient cooling, the monomeric nitroso-nitrate addition compound is converted to the corresponding dimeric bimolecular nitroso compound, in the crystalline state. This formation of the dimer (i. e., dimerization of the monomer) may, therefore, be accomplished by permitting the previously withdrawn warm liquid monomer to stand at a temperature higher than room temperature until dimer formation has taken place. Preferably, the monomer is subjected to refrigeration or positive cooling in a suitable cooling chamber, in which a temperature between about 0° C. and about 10° C. is maintained, in order to hasten dimer formation. The formation of the dimeric bimolecular nitroso compound from the monomeric nitroso-nitrate addition compound may be represented as follows, in which either monomer I or monomer II obtained from Reaction A, indicated above, is converted to the corresponding dimer.

REACTION B

Nitroso-nitrate addition compound

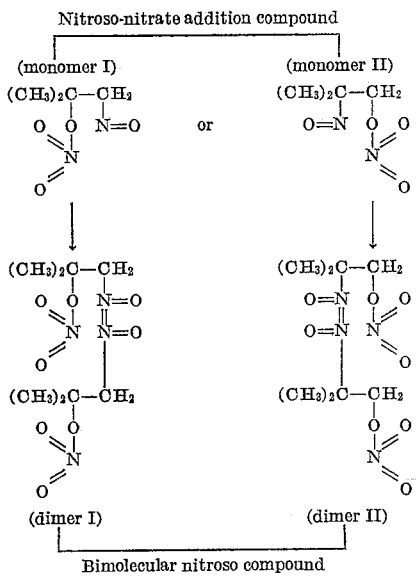

Bimolecular nitroso compound

As indicated above, the bimolecular nitroso compound resulting from the cooling of the monomeric nitroso-nitrate addition compound is obtained in the crystalline state. However, it has been found that there may also be some quantities of unreacted monomer present in the resulting product, inasmuch as an apparent state of equilibrium has been found to exist between the dimer and by-products of reaction at which point no further quantities of monomer will be converted to the dimer. This mixture of crystalline dimer and liquid monomer is, therefore, filtered in order to effect the separation of the dimer, as a crystalline residue, from the liquid unreacted monomer. The unreacted monomer may be further treated or utilized for purposes outside the scope of the present process.

The crystalline bimolecular nitroso compound is next subjected to hydrogenation in order to produce hydrazine as a product of the process. In carrying out the hydrogenation treatment, the crystals are preferably dissolved in a liquid solvent so that the hydrogenation may be conducted while the dimer is in a liquid state. For this purpose the solvent may be a light alcohol such as methanol, ethanol; or light ethers such as ethyl ether, or propyl ether. This resulting liquid mixture of the crystalline dimeric bimolecular nitroso compound is then introduced into a suitable reaction vessel and subjected to hydrogenation at a temperature between about 10° C. and about 150° C., with a temperature between about 25° C. and about 75° C. being preferred; and at a pressure of at least one atmosphere, with pressures between about 50 and about 100 atmospheres being preferred. The hydrogenation is carried out in the presence of a hydrogenation catalyst, such as platinum oxide or palladium oxide to produce the desired hydrazine product. The catalyst may be a pelleted or powdered catalyst, either supported or unsupported. The catalyst is preferably maintained as a slurry or suspension. The conversion of the bimolecular nitroso compound, by the aforementioned catalytic hydrogenation employing platinum as a suitable catalyst, may be represented as follows:

REACTION C

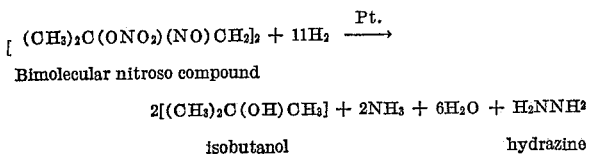

From Reaction C it will be seen that the product of hydrogenation is a liquid mixture comprising not only hydrazine, but also ammonia, water and the corresponding alcohol of the olefin starting material, having a number of carbon atoms equal to that contained in the olefin molecule. The desired hydrazine product may then be separated from the above hydrogenation mixture by fractional distillation, alternated with low temperature crystallization. It is preferred, however, to neutralize this hydrogenation mixture with a mineral acid, such as sulfuric acid, to produce a mixture comprising hydrazine sulfate, ammonium sulfate, water, the produced alcohol and the solvent employed for the hydrogenation of the dimer. Water, alcohol and solvent are then distilled from the hydrazine sulfate and ammonium sulfate. The hydrazine sulfate-ammonium sulfate residue is next washed with water, previously acidified with sulfuric acid, to dissolve ammonium sulfate. Hydrazine sulfate, being comparatively insoluble, will not be affected by the aforementioned washing treatment. Barium hydroxide is then added to the resulting mixture to obtain a mixture comprising barium sulfate, water and liquid hydrazine. Liquid hydrazine is then distilled from this mixture as a product of the process.

For a fuller understanding of the process of the present invention, reference is had to the accompanying drawing which illustrates, diagrammatically, an elevation view of one form of the apparatus employed and capable of carrying out an embodiment of the process of the invention. It should be noted, however, that it is not intended that the invention be limited to the embodiment as illustrated, but is capable of other embodiments which may extend beyond the scope of the apparatus illustrated. Some of the mechanical elements necessary to effect the transfer of liquids and vapors and to maintain the conditions of temperature and pressure necessary to carry out the function of the apparatus, have been omitted in order to simplify the description.

Referring to the drawing, olefin, such as isobutylene, is introduced through line 10 at an upper point in a reaction chamber 11. A suitable nitrosating agent, such as nitrogen dioxide, is also introduced at an upper point in chamber 11 through line 12. The olefin and nitrosating agent are reacted in chamber 11 under either liquid, vapor or mixed phase conditions, as previously described, in accordance with the particular selected temperature conditions stated above, with the olefin being introduced into chamber 11 in excess of the stoichiometric requirement of the nitrosating agent. The required temperature conditions are maintained in chamber 11 by suitable heating or cooling means represented by heat exchanger 13. The resulting reaction product, which is a liquid mixture comprising the monomeric nitroso-nitrate addition product and excess olefin, is transferred from chamber 11 through line 14 to a distillation tower 15. Tower 15 is heated to distill off unreacted olefin which is withdrawn through line 16 and transferred through this line for reuse in reaction chamber 11, via line 10 with which line 16 connects. The liquid monomer nitroso-nitrate addition compound is withdrawn from tower 15 as a residue through line 16a.

The liquid monomer residue withdrawn through line 16a is next transferred through this line to a suitable cooling chamber, represented by dimerization chamber 17 in the drawing, to convert the monomer to the corresponding dimeric bimolecular nitroso compound. Chamber 17 is cooled to a temperature within the aforementioned range of between about 0° C. and about 10° C. to effect the desired dimer formation. The required temperature conditions are maintained in this chamber by suitable cooling means, represented by heat exchanger 18. Following dimerization in chamber 17, the resulting product, as previously indicated, comprises crystalline dimer and unreacted liquid monomer. This product is withdrawn from chamber 17 through line 19.

The mixture of crystalline dimer and liquid monomer in line 19 is next transferred through this line to a separation chamber 20. In chamber 20 liquid monomer is separated by means such as filtration or centrifuging from the solid crystalline dimer. The separated liquid monomer in chamber 20 is withdrawn through line 21 for further use or treatment outside the scope of the present process. The solid crystalline dimer is withdrawn through line 22 and is transferred through this line to a mixing vessel, represented by mixer 23. In mixer 23 the crystalline dimer is next contacted with a liquid solvent, introduced through line 24, in an amount sufficient to dissolve all of the dimer present. The resulting dimer solution is withdrawn through line 25 and transferred through this line to a hydrogenation reactor 26.

In carrying out the hydrogenation treatment of the dimer to produce the desired hydrazine product, hydrogen is introduced at a point in the lower portion of reactor 26 through line 27. In reactor 26 the dimer introduced through line 25 is subjected to hydrogenation, in the presence of a suitable hydrogenation catalyst 28 under the aforementioned conditions of temperature and pressure. In order to maintain the desired temperature conditions within reactor 26, suitable heating means, represented by heat exchanger 29, are employed. The product of hydrogenation in reactor 26 comprises a liquid mixture of hydrazine, ammonia, water and the corresponding alcohol of the olefin starting material, as described above. This mixture is withdrawn from reactor 26 through line 30, and is subjected to further treatment, in accordance with the process hereinbefore described, to obtain hydrazine as a product of the process.

The following example will serve to illustrate, but is not intended in any way to unduly limit the process of the present invention.

*Example*

Employing apparatus similar to that shown in the drawing, both vapor phase and liquid phase reaction of isobutylene and nitrogen dioxide was carried out according to the following procedure to obtain, ultimately, a bimolecular nitroso compound which was subsequently reduced to yield hydrazine:

Isobutylene and nitrogen dioxide were first reacted in the vapor phase, with isobutylene being present in excess, at a temperature of about 25° C. and produced a blue-green reaction product. The reaction was next carried out in a liquid phase operation with nitrogen dioxide passed into excess isobutylene at about —6° C., the boiling point of isobutylene. The reaction in each instance appeared to proceed quantitatively, the nitrogen dioxide being completely consumed and the same blue-green compound being produced. A yield of more than 90% of this blue-green compound was obtained in both vapor phase and liquid phase operation. The unreacted isobutylene was evaporated, leaving the blue-green reaction product. This product was refrigerated over-night at about 0° C., causing the crystallization of an appreciable portion. The crystalline material was filtered and washed free from remaining portions of the blue-green compound with ether. The resulting crystals were colorless.

Identity of the compounds produced from the above reaction, was established by evidence based primarily on the absorption spectra of these compounds in iso-octane as a solvent. It was found that the blue-green liquid product was a nitroso-nitrate addition compound of isobutylene and that the colorless crystalline material produced from the cooling of the blue-green liquid, is a dimer of this nitroso compound. X-ray diffractionation patterns for the colorless solid product exhibited a distinct crystalline structure. By analogy with the chemical behavior of other bimolecular nitroso compounds and a C, H, N analysis, it was confirmed that the crystalline material was a dimeric form of the blue-green nitroso compound. The results of microanalyses for C, H, N are as follows:

|  | Determined | Calculated |
| --- | --- | --- |
| Percent C | 32.57 | 32.5 |
| Percent H | 5.35 | 5.4 |
| Percent N | 17.17 | 18.9 |

The colorless crystalline dimer of the nitroso-nitrate addition compound of isobutylene was next reduced catalytically with hydrogen in an Aminco pressure micro-bomb. The bomb was charged with 1 gm. of the crystalline material in 30 ml. of absolute methyl alcohol and about 0.2 gm. of platinum oxide catalyst. The reaction temperature was maintained at about 50° C. and the bomb was agitated throughout the run. After two hours, the bomb was vented and the bomb contents were recovered. A qualitative analysis for hydrazine on the methyl alcohol solution showed hydrazine to have been definitely produced. Another catalytic reduction with hydrogen was carried out in the pressure micro-bomb using ethyl ether as a solvent and platinum oxide as a catalyst. The reaction temperature was maintained at about 25° C. and at a pressure between about 1000 and about 1500 pounds per square inch. As before, the bomb was vented and the contents recovered. A qualitative analysis on the ethyl ether solution also showed that hydrazine had been definitely produced.

While a particular embodiment of the process of the present invention has been described for the purpose of illustration, it should be understood that various modifications and adaptations thereof, which will be obvious to one skilled in the art, may be made without departing from the spirit of the invention.

We claim:

1. A process for the manufacture of hydrazine which comprises: reacting an olefin having at least one unsaturated tertiary carbon atom with a nitrosating agent selected from the group consisting of nitrogen dioxide, nitric oxide, nitrogen trioxide and nitrogen pentoxide at a temperature between about —140° C. and about 200° C. to produce the corresponding monomeric nitroso-nitrate addition compound; dimerizing said monomeric compound at a temperature not higher than room temperature to form the corresponding bimolecular nitroso compound; and subjecting the compound thus obtained to hydrogenation at a pressure of at least one atmosphere and in the presence of a hydrogenation catalyst to produce hydrazine as a product of the process.

2. A process for the manufacture of hydrazine which comprises: reacting an olefin having at least one unsaturated tertiary carbon atom with a nitrosating agent selected from the group consisting of nitrogen dioxide, nitric oxide, nitrogen trioxide and nitrogen pentoxide at a temperature between about —20° C. and about 100° C. to produce the corresponding monomeric nitroso-nitrate addition compound; dimerizing said monomeric compound at a temperature not higher than room temperature to form the corresponding bimolecular nitroso compound; and subjecting the compound thus obtained to hydrogenation at a pressure of at least one atmosphere and in the presence of a hydrogenation catalyst to produce hydrazine as a product of the process.

3. The process of claim 2 wherein said nitrosating agent is nitrogen dioxide.

4. The process of claim 2 wherein said nitrosating agent is nitric oxide.

5. The process of claim 2 wherein said nitrosating agent is nitrogen trioxide.

6. The process of claim 2 wherein said nitrosating agent is nitrogen pentoxide.

7. A process for the manufacture of hydrazine which comprises: reacting an olefin having at least one unsaturated tertiary carbon atom with a nitrosating agent selected from the group consisting of nitrogen dioxide, nitric oxide, nitrogen trioxide and nitrogen pentoxide under liquid phase conditions at a temperature between about −140° C. and about 50° C. to produce the corresponding monomeric nitroso-nitrate addition compound; dimerizing said monomeric compound at a temperature not higher than room temperature to form the corresponding bimolecular nitroso compound; and subjecting the compound thus obtained to hydrogenation at a pressure of at least one atmosphere and in the presence of a hydrogenation catalyst, to produce hydrazine as a product of the process.

8. A process for the manufacture of hydrazine which comprises: reacting an olefin having at least one unsaturated tertiary carbon atom with a nitrosating agent selected from the group consisting of nitrogen dioxide, nitric oxide, nitrogen trioxide and nitrogen pentoxide under liquid phase conditions at a temperature between about −20° C. and about 20° C. to produce the corresponding bimolecular nitroso compound; and subjecting the compound thus obtained to hydrogenation at a pressure of at least one atmosphere and in the presence of a hydrogenation catalyst, to produce hydrazine as a product of the process.

9. A process for the manufacture of hydrazine which comprises: reacting an olefin having at least one unsaturated tertiary carbon atom with a nitrosating agent selected from the group consisting of nitrogen dioxide, nitric oxide, nitrogen trioxide, and nitrogen pentoxide under vapor phase conditions at a temperature between about −10° C. and about 200° C. to produce the corresponding monomeric nitroso-nitrate addition compound; dimerizing said monomeric compound at a temperature not higher than room temperature to form the corresponding bimolecular nitroso compound; and subjecting the compound thus obtained to hydrogenation at a pressure of at least one atmosphere and in the presence of a hydrogenation catalyst, to produce hydrazine as a product of the process.

10. A process for the manufacture of hydrazine which comprises: reacting an olefin having at least one unsaturated tertiary carbon atom with a nitrosating agent selected from the group consisting of nitrogen dioxide, nitric oxide, nitrogen trioxide and nitrogen pentoxide under vapor phase conditions at a temperature between about 20° C. and about 100° C. to produce the corresponding monomeric nitroso-nitrate addition compound; dimerizing said monomeric compound at a temperature not higher than room temperature to form the corresponding bimolecular nitroso compound; and subjecting the compound thus obtained to hydrogenation at a pressure of at least one atmosphere and in the presence of a hydrogenation catalyst, to produce hydrazine as a product of the process.

11. A process for the manufacture of hydrazine which comprises: reacting an olefin having at least one unsaturated tertiary carbon atom with a nitrosating agent selected from the group consisting of nitrogen dioxide, nitric oxide, nitrogen trioxide and nitrogen pentoxide at a temperature between about −140° C. and about 200° C. to produce a mixture comprising the corresponding monomeric nitroso-nitrate addition compound and unreacted olefin; dimerizing the monomeric compound in said mixture at a temperature not higher than room temperature to convert said monomeric compound to the corresponding bimolecular nitroso compound in the crystalline form; separating crystals of said bimolecular nitroso compound from the resulting mixture; dissolving said crystals in a liquid organic solvent; subjecting the resulting solution to hydrogenation at a temperature between about 10° C. and about 150° C. and at a pressure of at least one atmosphere in the presence of a hydrogenation catalyst to produce a mixture comprising hydrazine; and separating hydrazine from said mixture.

12. A process for the manufacture of hydrazine which comprises: reacting an olefin having at least one unsaturated tertiary carbon atom with a nitrosating agent selected from the group consisting of nitrogen dioxide, nitric oxide, nitrogen trioxide and nitrogen pentoxide under liquid phase conditions at a temperature between about −140° C. and about 50° C. to produce a mixture comprising the corresponding monomeric nitroso-nitrate addition compound and unreacted olefin; dimerizing the monomeric compound in said mixture the temperature not higher than room temperature to convert said monomeric compound to the corresponding bimolecular nitroso compound in the crystalline form; separating crystals of said bimolecular nitroso compound from the resulting mixture; dissolving said crystals in a liquid solvent; subjecting the resulting solution to hydrogenation at a temperature between about 10° C. and about 150° C. and at a pressure of at least one atmosphere and in the presence of a hydrogenation catalyst to produce a mixture comprising hydrazine; and separating hydrazine from said mixture.

13. A process for the manufacture of hydrazine which comprises: reacting an olefin having at least one unsaturated tertiary carbon atom with a nitrosating agent selected from the group consisting of nitrogen dioxide, nitric oxide, nitrogen trioxide and nitrogen pentoxide under liquid phase conditions at a temperature between about −20° C. and about 20° C. to produce a mixture comprising the corresponding bimolecular nitroso compound in the crystalline form; separating crystals of said bimolecular nitroso compound from said mixture; dissolving said crystals in a liquid solvent; subjecting the resulting solution to hydrogenation at a temperature between about 10° C. and about 150° C. and at a pressure of at least one atmosphere in the presence of a hydrogenation catalyst to produce a mixture comprising hydrazine; and separating hydrazine from said mixture.

14. A process for the manufacture of hydrazine which comprises: reacting an olefin having at least one unsaturated tertiary carbon atom with a nitrosating agent selected from the group consisting of nitrogen dioxide, nitric oxide, nitrogen trioxide and nitrogen pentoxide under vapor phase conditions at a temperature between about −10° C. and about 200° C. to produce a mixture comprising the corresponding monomeric nitroso-nitrate addition compound and unreacted olefin; dimerizing the monomeric compound in said mixture the temperature not higher than room temperature to convert said monomeric compound to the corresponding bimolecular nitroso compound in the crystalline form; separating crystals of said bimolecular nitroso compound from the resulting mixture; dissolving said crystals in a liquid solvent; subjecting the resulting solution to hydrogenation at a temperature between about 10° C. and about 150° C. and at a pressure of at least one atmosphere in the presence of a hydrogenation catalyst to produce a mixture comprising hydrazine; and separating hydrazine from said mixture.

15. A process for the manufacture of hydrazine which comprises: reacting an olefin having at least one unsaturated tertiary carbon atom with a nitrosating agent selected from the group consisting of nitrogen dioxide, nitric oxide, nitrogen trioxide and nitrogen pentoxide under vapor phase conditions at a temperature between about 20° C. and about 100° C. to produce a mixture comprising the corresponding monomeric nitroso-nitrate addition compound and unreacted olefin; dimerizing the monomeric compound in said mixture the temperature not higher than room temperature to convert said monomeric compound to the corresponding bimolecular nitroso compound in the crystalline form; separating crystals of said bimolecular nitroso compound from the resulting mixture; dissolving said crystals in a liquid solvent; subjecting the resulting solution to hydrogenation at a temperature between about 10° C. and about 150° C. and at a pressure of at least one atmosphere in the presence of a hydrogenation catalyst to produce a mixture comprising hydrazine; and separating hydrazine from said mixture.

16. A process for the manufacture of hydrazine which comprises: reacting isobutylene with a nitrosating agent comprising nitrogen dioxide under liquid phase conditions at a temperature between about −20° C. and about 20° C. to produce a mixture comprising the corresponding bimolecular nitroso compound in the crystalline form; separating crystals of said bimolecular nitroso compound from said mixture; dissolving said crystals in a light alcohol; subjecting the resulting solution to hydrogenation at a temperature between about 25° C. and about 75° C. and at a pressure between about 50 and about 100 atmospheres in the presence of a hydrogenation catalyst comprising platinum to produce a mixture comprising hydrazine; and separating hydrazine from said mixture.

References Cited in the file of this patent

UNITED STATES PATENTS

| 1,959,503 | Seuffert et al. | May 22, 1934 |

FOREIGN PATENTS

| 199,750 | Great Britain | June 29, 1923 |

OTHER REFERENCES

"An Outline of Organic Chemistry," 1937 ed., pp. 32, 33. Authors are Degering, Nelson and Harrod. Barnes & Noble, Inc., New York.